United States Patent
Carter

(10) Patent No.: US 6,722,080 B2
(45) Date of Patent: Apr. 20, 2004

(54) FLY TRAP AND A BAIT THEREFOR

(75) Inventor: Danny B. Carter, Titusville, FL (US)

(73) Assignee: Bayside Holdings, Inc., Pensacola, FL (US)

( * ) Notice: Subject to any disclaimer, the term of this patent is extended or adjusted under 35 U.S.C. 154(b) by 0 days.

(21) Appl. No.: 10/384,659

(22) Filed: Mar. 11, 2003

(65) Prior Publication Data

US 2003/0167677 A1 Sep. 11, 2003

Related U.S. Application Data

(62) Division of application No. 09/656,735, filed on Sep. 7, 2000, now Pat. No. 6,546,667.

(51) Int. Cl.[7] ................................................. A01M 1/20
(52) U.S. Cl. ............................................ 43/107; 426/1
(58) Field of Search ................................ 426/1; 43/107

(56) References Cited

U.S. PATENT DOCUMENTS

| | | |
|---|---|---|
| 722,143 A | 3/1903 | Raymond |
| 882,306 A | 3/1908 | Fredrickson |
| 1,107,091 A | 8/1914 | Mielke |
| 1,221,098 A | 4/1917 | Shackelford |
| 1,319,369 A | 10/1919 | Widmer |
| 1,497,800 A | 6/1924 | Smith |
| 1,554,124 A | 9/1925 | Ongstad |
| 1,715,958 A | 6/1929 | Strand |
| 1,924,379 A | 8/1933 | Reese |
| 3,653,145 A | 4/1972 | Stout |
| 3,950,886 A | 4/1976 | Newhall et al. |
| 4,244,135 A | 1/1981 | Harwoods |
| 4,438,585 A | 3/1984 | Slatton |
| 4,551,941 A | 11/1985 | Schneidmiller |
| 5,048,225 A | 9/1991 | Brandli |
| 5,243,781 A | 9/1993 | Carter |
| D350,802 S | 9/1994 | Herbert |
| 5,461,822 A | 10/1995 | Green et al. |
| 5,647,164 A | 7/1997 | Yates |
| 5,679,363 A | 10/1997 | Yang et al. |
| 5,698,208 A | 12/1997 | Nigg et al. |
| 5,842,305 A | 12/1998 | Liao |
| 5,896,695 A | 4/1999 | Walker |
| 5,915,948 A | 6/1999 | Kunze et al. |
| 5,939,062 A | 8/1999 | Heath et al. |
| D415,548 S | 10/1999 | Nunes et al. |
| 5,992,087 A | 11/1999 | Chu et al. |
| 6,546,667 B1 * | 4/2003 | Carter .......................... 43/107 |

* cited by examiner

Primary Examiner—Charles T. Jordan
Assistant Examiner—Jordan Lofdahl
(74) Attorney, Agent, or Firm—Smith, Gambrell & Russell, LLP

(57) ABSTRACT

A fly trap includes a cylindrical side wall made of a mesh material; a bottom wall located proximate (i.e., "at or near") the bottom end of the side wall; a top wall located proximate the top end of the side wall; a conical entry conduit extending from proximate the bottom wall and providing an entry path to the interior chamber of the fly trap; and a lure holding device for holding a fly lure composition beneath the bottom opening of the entry conduit. The entry conduit may include an extending flange member that forms at least a portion of the bottom wall of the trap. Preferably, the top wall and/or some other part of the fly trap includes a light reflecting device, such as a prism or reflector, to help attract attention to the trap in the daylight. Also, to help attract attention to the trap at night, one or more surfaces may be coated with or constructed from a material that glows in the dark (e.g., a powder containing a commercially available phosphorescent material). The lure holding device may contain a suitable fly lure composition, such as one containing about 0.5–3% dried animal blood, wherein the dried animal blood is dried in such a manner that proteins contained therein are not denatured and amino acids contained therein remain intact, and about 0.1–5% sweet brewer's yeast (all percentages are weight percentages based on the entire weight of the composition).

8 Claims, 4 Drawing Sheets

FLY TRAP AND A BAIT THEREFOR

CROSS REFERENCE TO RELATED APPLICATION

This application is a division of Ser. No. 09/656,735, filed Sep. 7, 2000, now U.S. Pat. No. 6,546,667 which is being incorporated in its entirety herein by reference.

BACKGROUND OF THE INVENTION

This invention relates to insect traps, and more particularly to a trap that is designed to trap flies and a lure for the trap.

It has been long known that flies are not only annoying insects, but also harmful to humans, because they carry various and numerous pathogenic germs, and their larvae can cause intestinal problems. As a result, it is desirable to destroy flies not only in one's home, but also in such commercial and public areas as food markets, restaurants, and the like.

Numerous different devices have been proposed for attracting and destroying flies. Some of the known devices comprise a tape with an adhesive coating that is suspended or laid flat on a surface, so as to cause flies to land on the adhesive surface and adhere to it.

Other devices propose the use of fly traps that have containment chambers, wherein a liquified bait is deposited. The bait attracts the flies to enter the chamber, wherein they will drown in the aqueous bait.

Similarly, much research has been conducted in an effort to formulate a lure for attracting flies. Unfortunately, such lures often contain pesticides that are unsafe for humans and domestic animals.

One improved fly trap device and a bait for the trap is described in U.S. Pat. No. 5,243,781 to Danny B. Carter, which patent is entirely incorporated herein by reference. The present invention provides various changes and/or improvements to the Carter fly trap device and bait described in this previous patent. Like the previous Carter fly trap device and bait, the present fly trap device and bait are advantageous because they are safe for the environment and contain no toxic substances.

SUMMARY OF THE INVENTION

It is therefore an object of the present invention to provide a fly trap for controlling disease carrying insects. It is a further object of the present invention to provide a fly trap that is simple to use and inexpensive to manufacture. It is still a further object of the present invention to provide a lure to be used with a fly trap for attracting flies. A still further object of the present invention is to provide a fly trap and lure that are non-toxic and environmentally safe.

In one embodiment, this invention relates to a fly trap, comprising: a cylindrical side wall made of a mesh material, wherein the side wall includes a bottom end and a top end; a bottom wall located directly at or near (i.e., "proximate") the bottom end of the side wall; a top wall located proximate the top end of the side wall, wherein the top wall includes a light reflecting device, and wherein the side wall, bottom wall, and top wall define an interior chamber of the fly trap that is adapted to receive and retain flies; an entry conduit extending from the bottom wall and providing an entry path to the interior chamber of the fly trap, the entry conduit having a bottom opening defined therein and a top opening defined therein that is smaller than the bottom opening; and a lure holding device for holding a fly lure composition beneath the bottom opening of the entry conduit.

In another embodiment, this invention relates to a fly trap, comprising: a cylindrical side wall made of a mesh material, wherein the side wall includes a bottom end and a top end; a bottom wall located proximate the bottom end of the side wall; a top wall located proximate the top end of the side wall, wherein the side wall, bottom wall, and top wall define an interior chamber of the fly trap that is adapted to receive and retain flies; an entry conduit extending from the bottom wall and providing an entry path to the interior chamber of the fly trap, the entry conduit having a bottom opening defined therein and a top opening defined therein that is smaller than the bottom opening, and a lure holding device for holding a fly lure composition beneath the bottom opening or bottom entry port of the entry conduit, wherein at least one of the side wall, bottom wall, top wall, entry conduit, or lure holding device is coated with a material that glows in the dark. Preferably, most or all of the surfaces of the fly trap are coated with a material that glows in the dark (e.g., a phosphorescent powder).

Another advantageous aspect of the fly trap according to the invention includes the use of a plurality of leg members extending below the bottom wall to support the side wall, bottom wall, and top wall of the trap. These leg members may include means to secure the leg member to a surface on which the fly trap is supported (e.g., holes to receive a bolt, screw, spike, or other securing device; clamping devices; clasping devices; cleats; ties; etc.). Preferably, each leg member includes a surface support portion for contacting a surface on which the fly trap is supported, wherein the surface support portion extends outside a cylinder defined by extending the side wall to the surface on which the fly trap is supported.

Another advantageous feature of the invention includes providing a bracket member extending from each leg member for supporting the lure holding device above the support surface and immediately below the bottom opening or bottom entry port of the entry conduit.

Alternatively, instead of supporting the fly trap on the ground using leg members, the trap also can be hung at a suitable location using a handle member provided at or near the top wall.

Another advantageous feature of the invention, which simplifies the structure and the manufacturing procedure, relates to the use of an integral, unitary construction for the entry conduit and at least a portion of the bottom wall. This can be accomplished, for example, if the entry conduit is formed with a flange that extends outward from the bottom opening or entry port, and this flange forms at least a portion of the bottom wall of the trap. Preferably, both the entry conduit and the flange are made of a mesh material (preferably the same mesh material that makes up the cylindrical side wall), and, in this manner, at least a portion of the bottom wall is made from the mesh material.

Another objective of this invention is to provide a new lure composition for a fly trap (also called a "bait mixture" or "dried bait mixture" in this specification). In general, the fly trap lure composition according to this aspect of the invention includes about 0.5–3% dried animal blood, wherein the dried animal blood is dried in such a manner that proteins contained therein are not denatured and amino acids contained therein remain intact; and about 0.1–5% sweet brewer's yeast, wherein all percentages are weight percentages based on the entire weight of the composition. A more detailed embodiment of a preferred lure composition comprises the following ingredients: 5–30% sucrose; 5–30% sodium carbonate; 20–50% bicarbonate of soda; 0.25–5% urea; 0.1–5% sweet brewer's yeast; 0.25–5% active dry yeast; 0.25–5% dried animal blood; 0.25–5% isoamyl acetate; 0.25–5% sodium lactate; and 10–50% water, wherein all percentages are percent by weight based on the total weight of the composition. As noted above, the dried animal blood in this composition may be dried in such a manner that proteins contained therein are not denatured and amino acids contained therein remain intact. Even more preferably, the fly lure composition comprises the following: about 12–16% sucrose; about 12–16% sodium carbonate; about 34–42% bicarbonate of soda; about 0.5–3% urea; about 0.25–2% sweet brewer's yeast; about 0.5–3% active dry yeast; about 0.5–3% dried animal blood (dried in the manner described above); about 0.5–3% isoamyl acetate; about 0.5–3% sodium lactate; and the balance water, wherein all percentages are percent by weight based on the total weight of the composition. This lure composition is advantageous because it attracts both male and female flies to the trap (the females being drawn by the protein containing dried blood ingredient).

Alternatively, the above-ingredients, excluding water, can be thoroughly admixed together and then water may be added at the time the admixture is used as a lure, to activate the lure composition. When making the dry admixture noted above, the lure material according to the present invention comprises the following ingredients: 10–30% sucrose; 10–30% sodium carbonate; 30–70% bicarbonate of soda; 0.25–5% urea; 0.1–5% sweet brewer's yeast; 0.25–5% active dry yeast; 0.25–5% dried animal blood; 0.25–5% isoamyl acetate; and 0.25–5% sodium lactate, wherein all percentages are percent by weight. Again, the dried animal blood used in this composition may be dried in such a manner that proteins contained therein are not denatured and amino acids contained therein remain intact. Preferably, this dry fly lure composition comprises the following: about 15–25% sucrose; about 15–25% sodium carbonate; about 40–60% bicarbonate of soda; about 0.5–3% urea; about 0.25–2% sweet brewer's yeast; about 0.5–3% active dry yeast; about 0.5–3% dried animal blood (dried in the manner described above); about 0.5–3% isoamyl acetate; and about 0.5–3% sodium lactate, wherein all percentages are percent by weight.

The bait mixture is non-toxic, contains no pesticides and, when mixed with a small amount of water to form a viscous composition, exudes a strong attractant odor to attract flies in a predetermined control area.

After consuming a small amount of the bait, the flies fly upwardly through the entry conduit and are entrapped within the interior chamber of the fly trap.

BRIEF DESCRIPTION OF THE DRAWINGS

The invention will be more fully understood when considered in conjunction with the following detailed description and the attached drawings. In the drawings and throughout this application, like parts are designated by like reference numerals. The drawings are briefly described as follows.

DETAILED DESCRIPTION OF THE PREFERRED EMBODIMENTS

Figure 1:
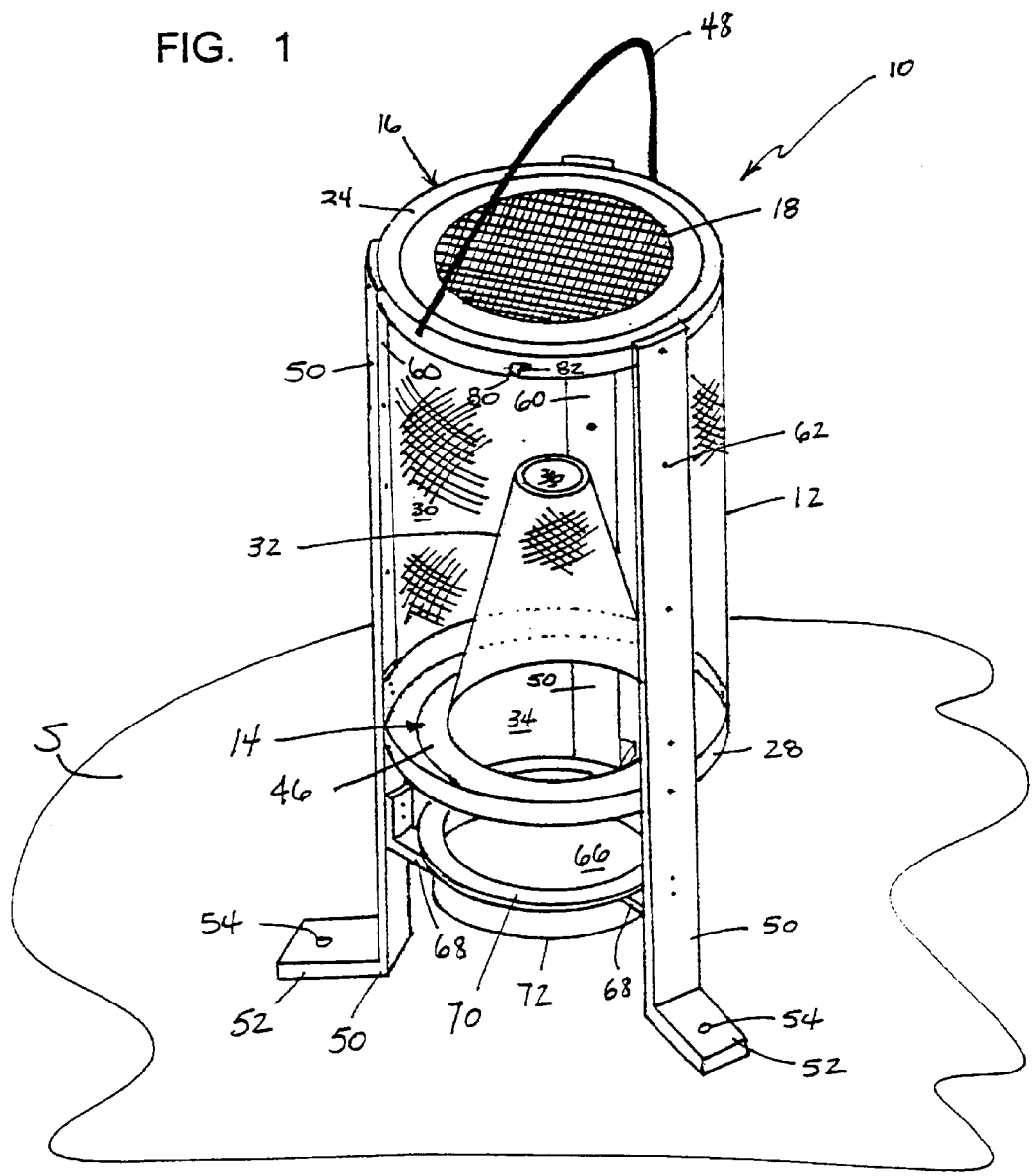
FIG. 1 is a perspective view of a fly trap according to the invention.

Referring to the drawings in detail, numeral 10 generally designates a fly trap device in accordance with the present invention. The fly trap 10 includes a screen mesh cylindrical side wall 12, which may be formed in any suitable shape, such as circular (as illustrated), square, or other polygonal shapes. The screen mesh may comprise a metal or plastic mesh having about 18 mesh per square inch. In the illustrated embodiment, the side wall 12 is a circular cylindrical wire mesh about 12 inches high and about 11 ⅞ inches in diameter. It is constructed from a single rectangular piece of cold galvanized wire mesh, formed in a circular configuration and stapled or otherwise secured together. For appearance purposes, the staple line or other junction that joins the two ends of the wire mesh can be hidden behind one of the legs of the trap 10. This aspect of the device will be discussed in more detail below.

A bottom wall 14 is located at or near the bottom end of the side wall 12, and a top wall 16 is located at or near the top end of the side wall 12. The bottom wall 14 can be made of any suitable material, but preferably it is made from the same type screen mesh as that which makes up the side wall 12. The top wall 16 also can be made of any suitable material. In the illustrated embodiment, the top wall 16 is made from a clear or translucent plastic acrylic, about 12 inches in diameter and about ½ inch thick, and it has a series of small prisms or other suitable reflecting devices 18 integrally formed therein. As used in this specification, the term "light reflecting device" includes prisms and any other suitable light reflectors. The prisms or reflectors 18 reflect sunlight and help draw attention to the fly trap 10 during daylight hours. Of course, without departing from the invention, prisms or other light reflecting devices could be provided on other surfaces of the fly trap 10. A preferred embodiment of the top wall 16 will be described in more detail below in conjunction with FIGS. 6–8.

Figure 5:
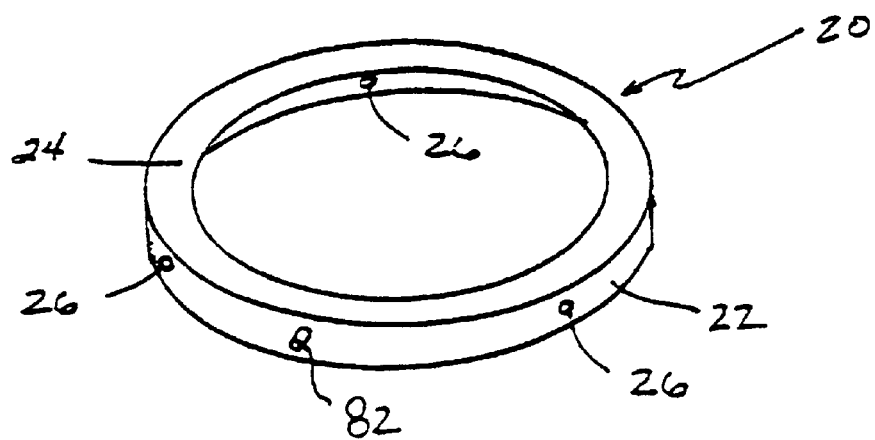
FIG. 5 is a view illustrating top and bottom ring members used in a fly trap device according to the invention.

The top wall 16 is secured over the top end of the cylindrical wall 12. The top end of the cylindrical wall 12 is held within a top ring member 20, preferably made of metal, but any other suitable construction material will suffice (because the top wall 16 typically is made of a clear plastic, the top ring 20 can be seen through the top wall 16 in FIG. 1). The top ring member 20 also is illustrated in FIG. 5. In the illustrated embodiment, the top ring member 20 has an outside diameter of about 12 inches, and the side walls thereof 22 are about 1 inch high. A ½ inch lip 24 is formed around the top perimeter of the top ring 20 such that the top end of the cylindrical wall 12 securely fits within and is held between the side walls 22 and the lip 24. The top ring 20 includes a plurality of screw or bolt holes 26 so that the ring 20 can be mounted to the remainder of the fly trap structure. Additionally, if desired, the top wall 16 can be secured to the top ring 20 in any suitable manner, for example, by adhesive or by providing key hole cuts 80 in the top wall 16 that attach to keys (or projections) 82 provided on the outside of wall 22 of the top ring 20. While only one key hole cut 80 and key 82 combination is shown in the figures, those skilled in the art will recognize that any suitable number of key holes and keys can be provided without departing from the invention.

A bottom ring 28, preferably of the same general construction as the top ring 20, is used to hold the bottom wall 14 in place and to hold the bottom end of the side wall 12. An interior chamber 30 is defined between the side wall 12, the bottom wall 14, and the top wall 16, which are held together by the rings 20 and 28. In the illustrated embodiment, the bottom ring 28 does not include key projections 82 as found on the top ring 20.

The fly trap 10 includes an entry conduit 32 that allows the flies to enter the interior chamber 30 of the fly trap 10. In the illustrated embodiment, the entry conduit 32 is conical shaped and made of the same wire mesh that makes up the side wall 12 and bottom wall 14 of the fly trap 10. The lower entry port 34 of the entry conduit 32, located at or near the bottom wall 14 of the fly trap 10, is larger than the upper entry port 36 of the entry conduit 32, located above the lower entry port 34.

Figure 2:
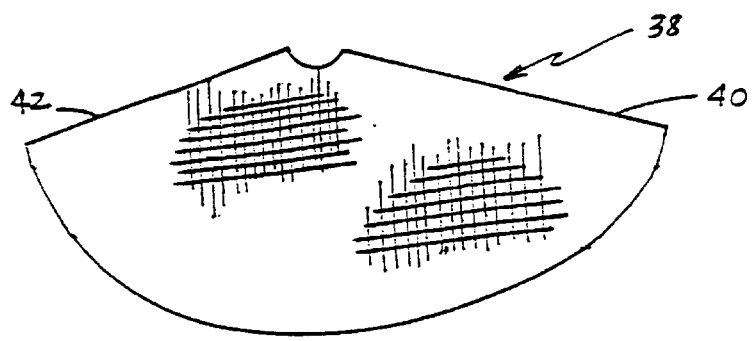
FIG. 2 is a view illustrating a blank for forming a conical entry conduit for use in a fly trap according to the invention.
Figure 3:
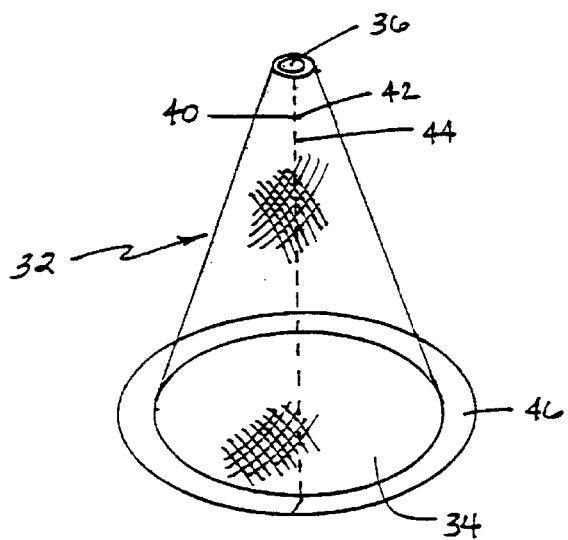
FIG. 3 is a view of the fully formed entry conduit.

In one embodiment of the invention, at least a portion of the bottom wall 14 of the fly trap 10 and the entry conduit 32 are formed as an integral unit. This can be accomplished as shown in FIGS. 2 and 3. To form the entry conduit 32, a flat entry conduit screen blank 38, as shown in FIG. 2, is prepared. The opposite side surfaces 40 and 42 of the flat blank 38 are brought together to form the conical shape as shown in FIG. 3. The opposite side surfaces 40 and 42 may be fixed together by any suitable means, such as staples 44, welding, or the like.

In forming the entry conduit 32, a flattened lip or flange 46 is formed around the outer circumference of the lower entry port 34. This flange 46 forms at least a portion of (and preferably all or essentially all of) the bottom wall 14 of the fly trap 10. The blank 38 is dimensioned such that the outer diameter of the flange 46 fits within and is retained by the lip of the bottom ring member 28. In one embodiment, the outer diameter of the flange 46 is about 12 inches, and the diameter of the lower entry port 34 is about 11 inches (which corresponds to a ½ inch flange 46 around the outside of the entry conduit 34). Also, in this embodiment, the upper entry port 36 is about ¾ inch in diameter, and the overall height of the formed entry conduit 32 is about 10 inches.

Different devices may be used to hold the fly trap 10 at the location where the flies are to be controlled. One such device is a handle member 48. Using the handle member 48, the fly trap 10 can be hung at any desired location. The handle member 48 also can be used for carrying the fly trap 10 from place to place. It can be made of any suitable material (e.g., metal or plastic), and it can be attached at the top of the fly trap 10 (e.g., to the top wall 16 or the leg members 50) in any suitable manner, such as in the conventional manners that bucket handles are attached to buckets. Any suitable device for hanging the trap 10 can be used without departing from the invention.

The fly trap 10 also can be supported directly on the ground or other generally horizontal surface S by a plurality of legs 50. In the illustrated embodiment, three legs 50 are provided, although any suitable number of legs may be used without departing from the invention. The illustrated leg members 50 extend the entire length of the side wall 12 and below the bottom wall 14 to the surface S on which the fly trap is supported. Each leg member 50 includes a surface support portion 52 for contacting the surface S on which the fly trap is supported. This surface support portion 52 extends outside of a cylinder defined by extending the side wall 12 to the surface S on which the fly trap 10 is held to thereby provide a stable base to support the trap 10.

Each leg member 50 includes a means for securing the leg member 50 to the surface S on which the fly trap 10 is supported. In the illustrated embodiment, this means for securing includes a hole 54 provided in the surface support portion 52. Screws, bolts, or spikes (not shown) can be used to securely fix the leg members 50 to support surface S through these holes 54. Any other suitable securing means can be used without departing from the invention, such as latch mechanisms, cable ties, clamping devices, clasping devices, cleats, ties, etc.

Figure 4:
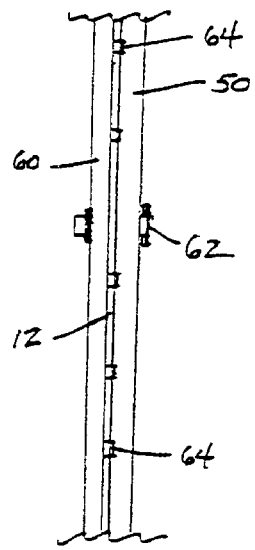
FIG. 4 is a partial side view of a fly trap according to the invention illustrating the junction of the leg member with the side wall.

In the illustrated embodiment, the leg members 50 extend essentially the entire length of the fly trap 10 and are secured to the top wall 16, the top ring 20, and the bottom ring 28 using screws, bolts, or another suitable attachment means. Advantageously, the leg members 50 also are attached to the side wall 12. This can be accomplished, for example, as shown in FIG. 4, by fixing the side wall 12 between the leg member 50 and an inner insert member 60. The overall combination of the leg member 50, side wall 12, and inner insert member 60 can be held together in any suitable manner, such as a bolt, screw, rivet, or other attachment device 62, as shown in FIG. 4, or by welding, soldering, or the like. FIG. 4 also illustrates the staples 64 that may be used to hold the two ends of the screen mesh together that form the side wall 12. As mentioned above, this line of staples 64 advantageously can be hidden between one of the leg members 50 and the corresponding inner insert member 60.

The fly trap 10 according to the invention further includes a lure holding pan 66 that holds a suitable lure composition. Because flies have a tendency to fly directly upward after feeding, this lure holding pan 66 is provided directly beneath the lower entry port 34 of the entry conduit 32. While the lure holding pan 66 may be placed directly on the support surface S, in the illustrated embodiment of the invention, the lure holding pan 66 is suspended above the support surface S on bracket members 68 that extend from each leg member 50. The bracket members 68 may be attached to the leg members 50 by any suitable method, such as spot welding, bolts, screws, rivets, etc. Using the illustrated arrangement, the lure holding pan 66 can be supported approximately an inch or two below the lower entry port 34 of the entry conduit 32.

The lure holding pan 66 can be held by the brackets 68 in any suitable manner. For example, as illustrated in FIG. 1, the lure holding pan 66 may include a lip 70 that rests on the brackets 68 by gravity. As another alternative, the brackets 68 may include raised bosses at their ends that fit into corresponding notches or recesses formed in the lure holding pan 66 (e.g., notches or recesses formed on the bottom side of lip 70 or on the bottom surface 72 of the lure holding pan 66).

The fly trap 10 preferably is constructed of materials having a color that attracts flies (e.g., white). As noted above, the top wall 16 contains at least one prism or other light reflector 18 that is useful to attract attention to the fly trap 10 in daylight, and likewise, other surfaces also may include prisms or other light reflecting devices (in the illustrated embodiment, several small prisms 18 are integrally formed in the central area of the top wall 16). Additionally, to help attract attention to the fly trap 10 at night, preferably at least one of the side wall 12, the bottom wall 14, the top wall 16, the top ring 20, the bottom ring 28, the entry conduit 32, the leg members 50, the brackets 68, or the lure holding device 66 is coated with a material that glows in the dark (e.g., a conventional, commercially available phosphor coating material that glows for about 2–4 hours after darkness falls). Preferably, many or all of these surfaces of the fly trap 10 are coated with this glow in the dark material.

Figure 6:
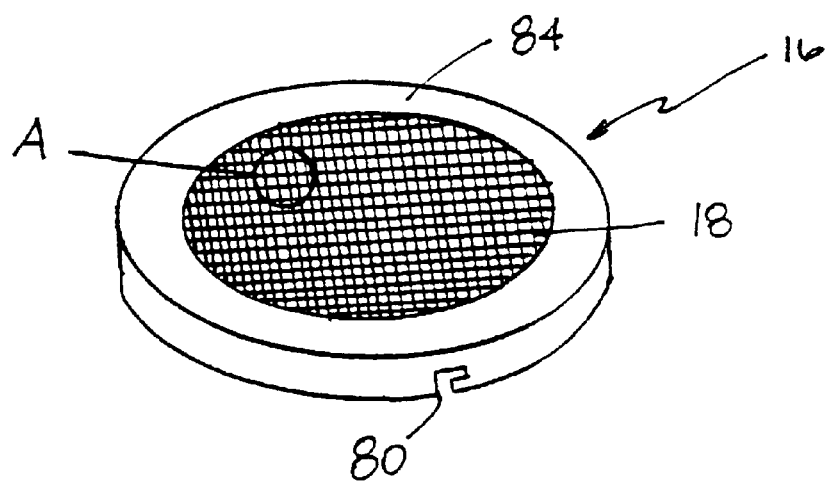
FIG. 6 is a view illustrating the top wall of a fly trap device according to the invention.
Figure 7:
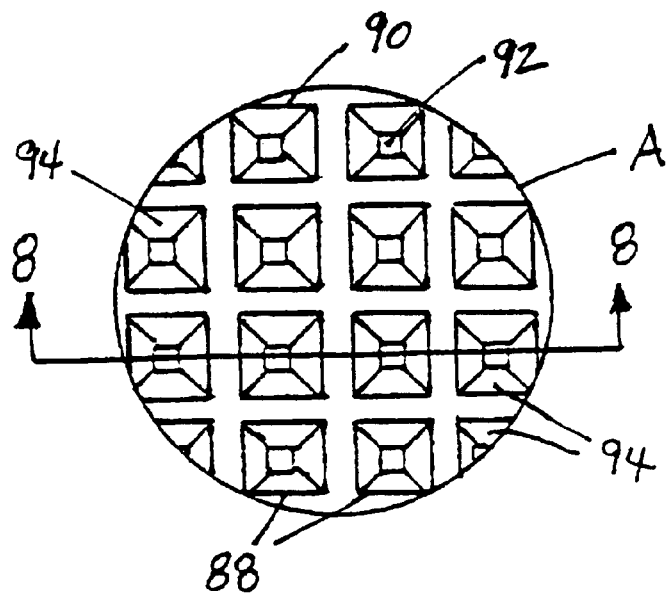
FIG. 7 is an enlarged view showing a portion of the prism or reflector area integrally formed in the top wall in one embodiment of the invention.
Figure 8:
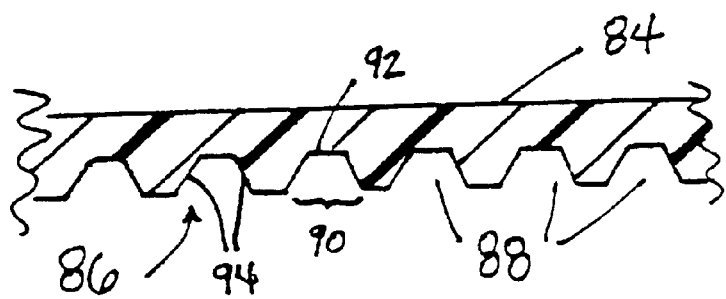
FIG. 8 is a partial cross sectional view of the prism or reflector area of the top wall shown in FIG. 7.

A preferred embodiment of the top wall 16 is illustrated in more detail in FIGS. 6–8. This top wall 16 is formed as a lid that fits over and secures to the top ring 20, as described above, via key projections 82 provided on the outer wall 22 of the top ring 20 that fit into key holes 80 provided in the top wall 16. Preferably, the top wall 16 is injection molded from a clear or translucent plastic material (e.g., an acrylic material or a polycarbonite plastic with a UV inhibitor therein) with small UV reflectors (or prisms) 18 integrally formed therein.

The prism area of the top wall 16 is shown in more detail in FIGS. 7 and 8. FIG. 7 includes an enlarged view of region A from FIG. 6, and FIG. 8 shows a cross sectional view of FIG. 7, taken across the center of one row of prisms. As shown in these figures, the top surface 84 of top wall 16 is generally smooth, and the bottom surface 86 has a series of raised pyramids 88 formed therein. The pyramids 88 have a larger, generally square bottom opening 90 and a smaller, generally square top surface 92 with angled walls 94 extending between these surfaces. These pyramids 88 act as prisms that reflect and refract light, generally attracting attention to the top wall 16 of the fly trap 10.

The lure holding pan 66 is adapted to receive a lure composition therein While any suitable bait or lure composition can be used, in a preferred embodiment of the invention, the lure composition is non-toxic, contains no pesticides that may be harmful to humans or domestic animals, and can be easily stored for a number of months in a dry condition. In a preferred embodiment, the lure composition comprises about 0.5–3% dried animal blood (e.g., bovine, horse, avian, etc.), wherein the dried animal blood is dried in such a manner (e.g., via cold spray drying) that proteins contained therein are not denatured and amino acids contained therein remain intact; and 0.1–5% sweet brewer's yeast (which masks the smell of the blood), wherein all percentages are weight percentages based on the entire weight of the composition. This protein containing dried blood material is useful to attract female flies to the trap. Suitable cold spray dried blood materials for use in the lure composition according to the invention can be obtained from California Spray Dry Company.

A lure material according to the present invention comprises the following ingredients: 5–30% sucrose; 5–30% sodium carbonate; 20–50% bicarbonate of soda; 0.25–5% urea; 0.1–5% sweet brewer's yeast; 0.25–5% active dry yeast; 0.25–5% dried animal blood; 0.25–5% isoamyl acetate; 0.25–5% sodium lactate; and 10–50% water, wherein all percentages are percent by weight. The dried animal blood used in this composition may be dried in such a manner that proteins contained therein are not denatured and amino acids contained therein remain intact, as described above. Preferably, the fly lure composition comprises the following: about 12–16% sucrose; about 12–16% sodium carbonate; about 34–42% bicarbonate of soda; about 0.5–3% urea; about 0.25–2% sweet brewer's yeast; about 0.5–3% active dry yeast; about 0.5–3% dried animal blood (dried in the manner described above); about 0.5–3% isoamyl acetate; about 0.5–3% sodium lactate; and the balance water, wherein all percentages are percent by weight.

One particularly preferred fly lure composition includes 300 parts (about 14%) sucrose; 300 parts (about 14%) sodium carbonate; 800 parts (about 38%) bicarbonate of soda; 20 parts (about 1%) urea; 12 parts (about 0.6%) sweet brewer's yeast; 24 parts (about 1%) active dry yeast; 20 parts (about 1%) dried animal blood, wherein the dried animal blood is dried in such a manner that proteins contained therein are not denatured and amino acids contained therein remain intact; 20 parts (about 1%) isoamyl acetate; 25 parts (about 1%) sodium lactate; and 600 parts (about 28%, and the balance) water, wherein all percentages are percent by weight and all parts are parts by weight. These ingredients are mixed together and then dried to produce a dry mixture of the lure composition.

Alternatively, the above-ingredients, excluding water, can be thoroughly admixed together and then water may be added at the time the admixture is placed in the lure holding pan 66, to activate the lure composition. When making the dry admixture noted above, the lure material according to the present invention comprises the following ingredients: 10–30% sucrose; 10–30% sodium carbonate; 30–70% bicarbonate of soda; 0.25–5% urea; 0.1–5% sweet brewer's yeast; 0.25–5% active dry yeast; 0.25–5% dried animal blood; 0.25–5% isoamyl acetate; and 0.25–5% sodium lactate, wherein all percentages are percent by weight. Again, the dried animal blood used in this composition may be dried in such a manner that proteins contained therein are not denatured and amino acids contained therein remain intact. Preferably, this dry fly lure composition comprises the following: about 15–25% sucrose; about 15–25% sodium carbonate; about 40–60% bicarbonate of soda; about 0.5–3% urea; about 0.25–2% sweet brewer's yeast; about 0.5–3% active dry yeast; about 0.5–3% dried animal blood (dried in the manner described above); about 0.5–3% isoamyl acetate; and about 0.5–3% sodium lactate, wherein all percentages are percent by weight.

One particularly preferred dry fly lure composition includes 300 parts (about 20%) sucrose; 300 parts (about 20%) sodium carbonate; 800 parts (about 53%) bicarbonate of soda; 20 parts (about 1.3%) urea; 12 parts (about 0.8%) sweet brewer's yeast; 24 parts (about 1.6%) active dry yeast; 20 parts (about 1.3%) dried animal blood, wherein the dried animal blood is dried in such a manner that proteins contained therein are not denatured and amino acids contained therein remain intact; 20 parts (about 1.3%) isoamyl acetate; and 25 parts (about 1.6%) sodium lactate, wherein all percentages are percent by weight and all parts are parts by weight. These ingredients are dry mixed together to form an admixture of the lure composition.

The dry mixture can be stored in an original package for an indefinite period of time and activated upon demand (by adding water). When necessary, a package containing, for example, 6 ounces of the dry mixture is emptied into the lure holding pan 66 and is thoroughly mixed with a small amount of water sufficient to form a viscous substance. The yeast causes activation and release of the attractant odor, attracting the flies to the lure holding pan 66. The mixture in the pan 66, if it dries out, can be reactivated by adding small amounts of water to keep the mixture in a relatively wet condition. The amount of dry mixture in the container, approximately 6 ounces, may last between 3 to 6 weeks, depending on the number of flies in the area and the humidity of the environment.

The lure holding pan 66 can be disposable or reusable, depending on the manner in which the lure composition is available. For example, if the lure composition is available directly in a suitable lure holding pan 66, then it is advantageous to produce the lure holding pan 66 from an inexpensive, disposable material. On the other hand, if the lure composition is available separately (e.g., in larger quantities), then a stronger, long lasting, and reusable lure holding pan 66 can be provided.

The use of the invention will now be described. When loaded with a bait composition like those described above, flies are attracted to the lure pan 66 of the fly trap 10. Once there, they eat some of the bait. Because flies naturally tend to fly upward after consuming food, the entry conduit 32 of the fly trap 10 according to the invention guides the flies upward and causes the flies to be entrapped within the interior chamber 30 of the trap 10.

In operation, the fly trap 10 according to the invention is positioned on a generally horizontal surface S, e.g., directly on the ground, on a pedestal or other support surface, at a distance of approximately 50 feet from the fly infested area to be controlled Alternatively, the fly trap 10 can be hung from an appropriate support using the handle 48. When exposed to sunlight, the prism or reflecting device(s) 18 on the trap 10 attracts the attention of flies, and/or at night, the glowing phosphorescent coating helps draw attention to the trap 10. Additionally, the smell of the lure composition provided in the lure holding pan 66 helps attract flies. Once they eat, the flies tend to fly straight upward and are guided into and retained in the interior chamber 30 of the trap 10 via the entry conduit 32.

The side wall(s) 12, bottom wall 14, and entry conduit 32 of the present invention can be constructed from metal or plastic mesh material, the top wall 16 can be constructed from a clear or translucent plastic, such as plastic acrylic, polycarbonite, etc., and other elements of the trap 10 can be made of plastic or metal as desired. The fly trap 10 of the present invention can find utilization in such areas as farms, grocery stores, waste disposal plants, land fields, hospitals, nursing homes, camp grounds, parks, zoos, etc.

Many changes and modifications can be made within the design of the fly trap device without departing from the spirit and scope of this invention, as defined in the appended claims.

What is claimed is:

1. A fly lure composition, comprising:
   5–30% sucrose; 5–30% sodium carbonate; 20–50% bicarbonate of soda; 0.25–5% urea; 0.1–5% sweet brewer's yeast; 0.25–5% active dry yeast; 0.25–5% dried animal blood; 0.25–5% isoamyl acetate; 0.25–5% sodium lactate; and 10–50% water, wherein all percentages are percent by weight based on the entire weight of the composition.

2. A fly lure composition according to claim 1, wherein the dried animal blood is dried in such a manner that proteins contained therein are not denatured and amino acids contained therein remain intact.

3. A fly lure composition, according to claim 1, wherein the composition includes about 12–16% sucrose; about 12–16% sodium carbonate; about 34–42% bicarbonate of soda, about 0.5–3% urea; about 0.25–2% sweet brewer's yeast; about 0.5–3% active dry yeast; about 0.5–3% dried animal blood, wherein the dried animal blood is dried in such a manner that proteins contained therein are not denatured and amino acids contained therein remain intact; about 0.5–3% isoamyl acetate; about 0.5–3% sodium lactate; and the balance water, wherein all percentages are percent by weight based on the entire weight of the composition.

4. A fly lure composition, comprising: about 0.5–3% dried animal blood, wherein the dried animal blood is dried in such a manner that proteins contained therein are not denatured and amino acids contained therein remain intact; and about 0.1–5% sweet brewer's yeast, wherein all percentages are weight percentages based on the entire weight of the composition.

5. A fly lure composition, comprising: 10–30% sucrose; 10–30% sodium carbonate; 30–70% bicarbonate of soda; 0.25–5% urea; 0.1–5% sweet brewer's yeast; 0.25–5% active dry yeast; 0.25–5% dried animal blood; 0.25–5% isoamyl acetate; and 0.25–5% sodium lactate, wherein all percentages are percent by weight based on the entire weight of the composition.

6. A fly lure composition according to claim 5, wherein the dried animal blood is dried in such a manner that proteins contained therein are not denatured and amino acids contained therein rein intact.

7. A fly lure composition according to claim 5, wherein the composition includes about 15–25% sucrose; about 15–25% sodium carbonate; about 40–60% bicarbonate of soda; about 0.5–3% urea; about 0.25–2% sweet brewer's yeast; about 0.5–3% active dry yeast; about 0.5–3% dried animal blood, wherein the dried animal blood is dried in such a manner that proteins contained therein are not denatured and amino acids contained therein remain intact; about 0.5–3% isoamyl acetate; and about 0.5–3% sodium lactate, wherein all percentages are percent by weight based on the entire weight of the composition.

8. A method of capturing flies, comprising:
   positioning a trap having the fly lure composition of claim 1 within an area considered to be potentially subject to an infestation of flies.

\* \* \* \* \*